Jan. 24, 1967 P. E. DOUBLE 3,299,500

METHOD OF MAKING A NUT AND PANEL ASSEMBLY

Filed Nov. 28, 1961 7 Sheets-Sheet 1

INVENTOR.
PLUMMER E. DOUBLE
BY
WILSON, SETTLE & CRAIG
ATTORNEYS

Jan. 24, 1967 P. E. DOUBLE 3,299,500
METHOD OF MAKING A NUT AND PANEL ASSEMBLY
Filed Nov. 28, 1961 7 Sheets-Sheet 2

INVENTOR.
PLUMMER E. DOUBLE
BY
WILSON, SETTLE & CRAIG
ATTORNEYS

Jan. 24, 1967 P. E. DOUBLE 3,299,500
METHOD OF MAKING A NUT AND PANEL ASSEMBLY
Filed Nov. 28, 1961 7 Sheets-Sheet 4

INVENTOR.
PLUMMER E. DOUBLE
BY
WILSON, SETTLE & CRAIG
ATTORNEYS

Jan. 24, 1967 P. E. DOUBLE 3,299,500
METHOD OF MAKING A NUT AND PANEL ASSEMBLY
Filed Nov. 28, 1961 7 Sheets-Sheet 5

INVENTOR.
PLUMMER E. DOUBLE
BY
WILSON, SETTLE & CRAIG
ATTORNEYS

FIG. 16

United States Patent Office 3,299,500
Patented Jan. 24, 1967

3,299,500
METHOD OF MAKING A NUT AND
PANEL ASSEMBLY
Plummer E. Double, Detroit, Mich., assignor to Multi-
fastener Corporation, Redford, Mich.
Filed Nov. 28, 1961, Ser. No. 155,340
2 Claims. (Cl. 29—432.2)

The present invention relates to a method of making a nut-panel assembly. More particularly, the present invention relates to a method of utilizing a pierce nut having a re-entrant panel-retaining groove therein, in forming a nut-panel assembly and to a method of making a final nut-panel assembly in which a portion of the panel is retained in a re-entrant groove by deformation of an adjacent portion of the nut.

The instant application is a continuation-in-part of and an improvement upon my earlier filed, co-pending application Serial No. 144,132, filed October 10, 1961, now abandoned, and assigned to the assignee of the present invention.

In my earlier filed application, I have disclosed and claimed a novel pierce nut and panel assembly and method wherein the nut not only serves as a piercing punch, but the nut is also deformed after piercing to provide a nut-to-panel interlock. The basic process utilized involves the staking or similar deformation of the nut, after piercing of the panel, to trap deformed panel portions adjacent the nut pilot portions between contiguous portions of the nut.

The present invention provides an improvement over this earlier invention in several respects. Probably the most important such improvement resides in the provision of a method of making a nut-panel assembly wherein a portion of the panel is retained within a re-entrant groove in the nut flange; the nut being deformed, after the piercing operation, to substantially reduce the volume of the groove and to overlie a portion of the panel metal retained in the groove to securely interlock the nut and the panel against relative displacement.

Further, this invention contemplates the shearing or staking of portions of the nut pilot portion which are not adjacent to a nut groove to form an increased nut-panel contact area, the deformation of the nut portions effecting the flow of nut metal between the pierced edge of the panel and the nut side surfaces to provide extended areas of nut-panel contact additional to the positive interlock therebetween.

Another important object of this invention resides in a method of making a nut having a re-entrant panel-receiving groove therein immediately adjacent a nut pilot or piercing portion by sequential rolling operations forming an initial open-throated groove intermediate the nut pilot portion and the nut flange portion and subsequently deforming one of the nut portions to reduce the throat of the groove to an extent such that the groove becomes re-entrant.

It is a further important object of this invention to provide a new and improved method of making a nut-panel assembly by initially piercing the nut through the panel, deforming the panel into a nut groove and subsequently deforming the nut to reduce the volume of the groove and to trap in the groove those portions of the panel previously displaced thereinto.

Still another, and no less important, object of the present invention is the provision of a method of assembling a nut and a panel by piercing the panel with a nut, displacing a portion of the panel into a re-entrant nut groove and subsequently deforming the nut to reduce the volume of the groove and to trap the metal therein.

Yet another object is to provide a method of increasing the area of nut-panel bearing contact exclusive of the region of nut-panel interlock by staking the nut after piercing to flow metal between the nut and the pierced hole.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figures 1, 3:
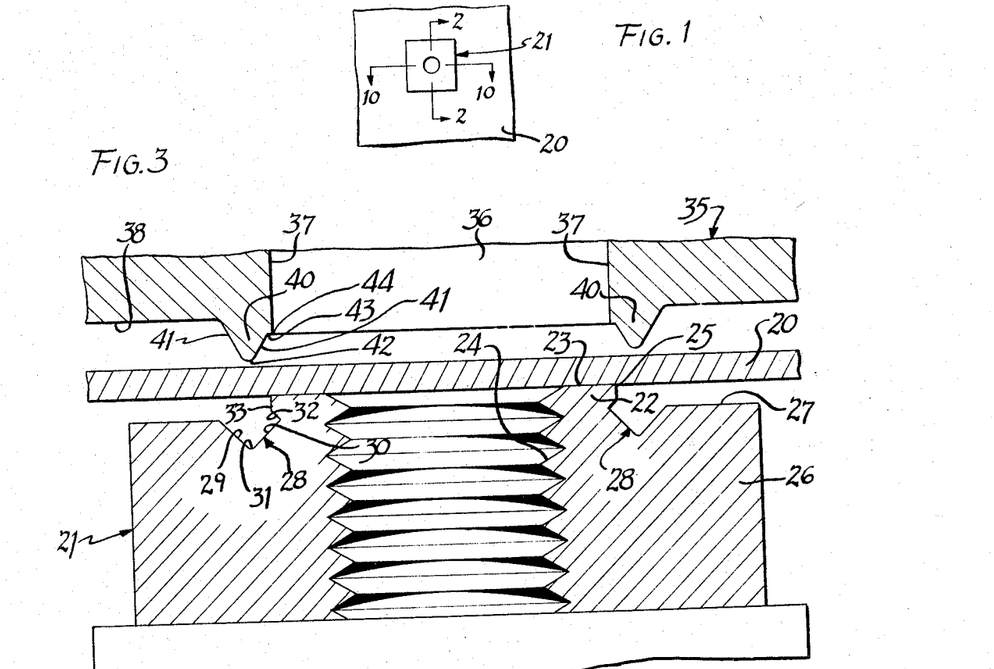
FIGURE 1 is a plan view of a nut-panel assembly of the present invention.
FIGURE 3 is a view similar in FIGURE 4 illustrating the nut and panel prior to assembly and showing the die button prior to initiation of the method.

As shown on the drawings:
In FIGURE 1, reference numeral 20 refers generally to a sheet metal panel adapted to have secured thereto a pierce nut 21.

As best illustrated in FIGURE 3 of the drawings, the nut 21 is generally rectangular in configuration and is provided at one face with a centrally located pilot portion 22 having a planar upper surface 23 encompassing a central threaded aperture 24. The outer extremities of the pilot portion 23 are defined by sharp, right angular corners 25. Laterally outwardly from the pilot portion 22, the nut is provided with oppositely directed side flanges 26 having upper planar flange surfaces 27. It will be noted that the nut 21 is thickest, i.e. greatest in the axial dimension of the threaded aperture 24, at the pilot portion 22, the difference in thickness between the pilot portion 22 and the flange portion 26 being substantially the thickness of the sheet metal panel 20. The unflanged sides of the nut 21 are planar, as will be hereafter more fully described.

Intermediate each of the flanges 26 and the pilot portion 22 is located an elongated groove 28. Each such groove 28 is coextensive with the nut 21 and is defined by a downwardly and inwardly inclined outer surface 29 and a downwardly and outwardly inclined surface 30, the two surfaces intersecting at a radiused groove bottom 31. Contiguous with the upper extremity of the inner inclined surface 30 is an upwardly and outwardly inclined surface 32 which merges at its outer extremity with the lateral or side surface 33 of the pilot portion 22.

It will be appreciated that the groove 28 is "re-entrant" in its cross-sectional contour, as well illustrated in FIGURE 3 of the drawings. This re-entrant characteristic occurs by virtue of the upper surface 32 which partially overlies the surface 30 to define an open upper entrance mouth for the groove 28, the groove mouth thus being restricted, i.e. is of less lateral dimension than the widest dimension of the groove.

The nut 21 and the panel 20 are assembled by a method or procedure involving the utilization of a forming die button indicated generally at 35 in FIGURE 3. This die button has a central, axially extending aperture 36 of substantially the size and contour of the nut pilot portion 22 although, as hereafter explained, the distance between the lateral sides 37 of the aperture 36 is somewhat less than the distance between the right-angular shearing or cutting edges 25 of the pilot portion 22. The die button is provided at one face with an outer planar surface 38 and with a pair of parallel longitudinally extending ribs 40 defined by downwardly inclined faces 41 converging at a radiused lower extremity 42. The inner of these converging surfaces 41 blends into the aperture wall 37 by means of a lateral surface 43 forming with the surface 37 a sharp shearing or staking corner 44. The surfaces 41, the extremity 42 an dthe corner 44 are all coextensive with the nut 21.

In the formation of the nut-panel assembly, the panel 20 is interposed between the die button 35 and the nut 21, and the nut 21 and the panel 20 are then displaced relative to the die button 35 in an initial movement. Subsequently, the nut 21 and the panel 20 are relatively displaced to pierce the nut through the panel. Finally, the panel 20, after piercing, is held between the surfaces 27 of the nut 21 and 38 of the die button 35 while the nut and die button are moved relative to one another.

Such relative movement can be carried out in any desired manner. For example, the die button 35 can be displaced into contact with the panel 20 as the panel is supported upon the fixed nut 21. Alternatively, the nut 21 can be displaced, as by a press punch toward the panel 20, the nut then displacing the panel into initial contact with the fixed die button. Further, the relative positions of the nut 21 and the die button 35 may be reversed with the nut being displaced vertically downwardly into operative relation with the fixed die button 35 or with the die button being displaced vertically upwardly.

In any event, the first action which occurs is the displacement of the panel 20 into contact with the die button and the piercing of the pilot portion 22 through the panel 20. Such piercing is a conventional pierce nut operation and does not appear to require elaboration at this time.

Figure 2:
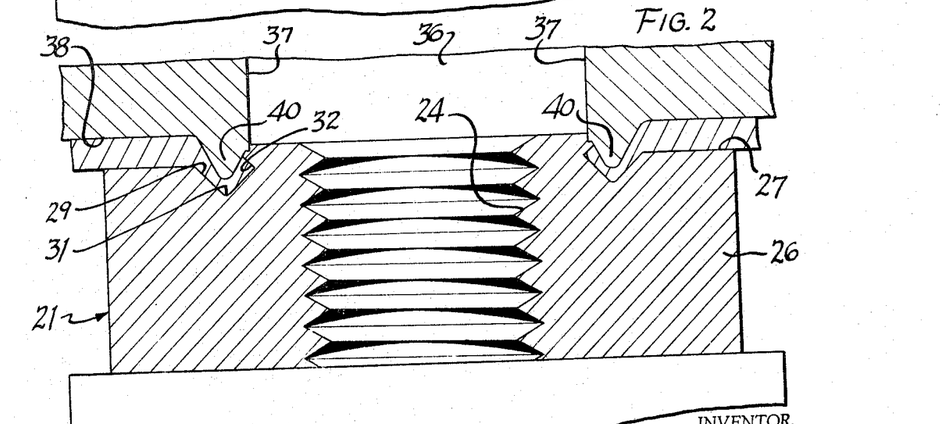
FIGURE 2 is a sectional view taken along the plane 2—2 of FIGURE 1, the nut-panel assembly being illustrated after assembly but still in contact with a die button to illustrate the method of the present invention.

During this piercing operation, the convergent or corner portions 42 of the die button projections 40 contact the panel and displace the panel, specifically the areas of the panel adjacent the pierced central portion thereof, into the nut grooves 28. It will be noted from FIGURE 2 that those portions of the panel 20 interposed between the die button ridges 42 and the groove surfaces 29 and 30 are of materially reduced thickness in view of the fact that more material is required to contact the convergent groove surfaces 29 and 30 and the convergent ridge surfaces 41 due to the contact of a relative short lateral portion of the panel with the extended surfaces between which this relatively short portion is interposed. The distances between the surfaces 41 of the ridge and the surfaces 29 and 30 of the groove 28 when the nut is finally bottomed on the die button as illustrated in FIGURE 2 are designed to obtain the necessary stock thickness.

The material thus contacted by the die button ridges 40 is depressed into the re-entrant grooves 28 and the resultant cold metal flow upon actuation of the press or other assembly device will substantially fill the re-entrant grooves. During the final stages of the displacement of the metal intermediate the ridges 41 and the grooves 28, the sharp shearing or staking corner 44 of the die button comes in contact with the exposed upper surface 23 of the nut pilot portion 22 inwardly of the pilot portion piercing corners 25. The upper surface 23 of the pilot portion 22 is, of course, exposed by the piercing and removal of that portion of the panel overlying the pilot portion surfaces 23 and further by the downward depression of the adjacent portions of the panel by the die button ridges 40.

Contact between the edges 44 of the die button 35 and the surface 23 of the pilot portion 22 will result in the shearing and transverse outward displacement of the piercing corners 25 of the nut 21. This outward staking or other deformation of the pilot portion 22 results in an increase in the re-entrant character of the grooves 28 and in the further restriction of the restricted opening initially provided for these re-entrant grooves 28. What actually occurs is, in effect, the lengthening of the surfaces 32. At the same time, the outward staking of the portion of the nut pilot 22 by these die button edges 44 reduces the volume of the re-entrant grooves 28 with the metal displaced from the nut pilot being displaced outwardly to overlie a portion of the panel metal previously displaced into the grooves 28.

This increase in the re-entrant character of the grooves, the reduction of the volume of the grooves, and the deformation of the nut pilot to overlie the panel metal in the grooves all increases the interlocking contact between the panel and the nut and prevents any subsequent escape of panel metal from the grooves.

Figure 4:
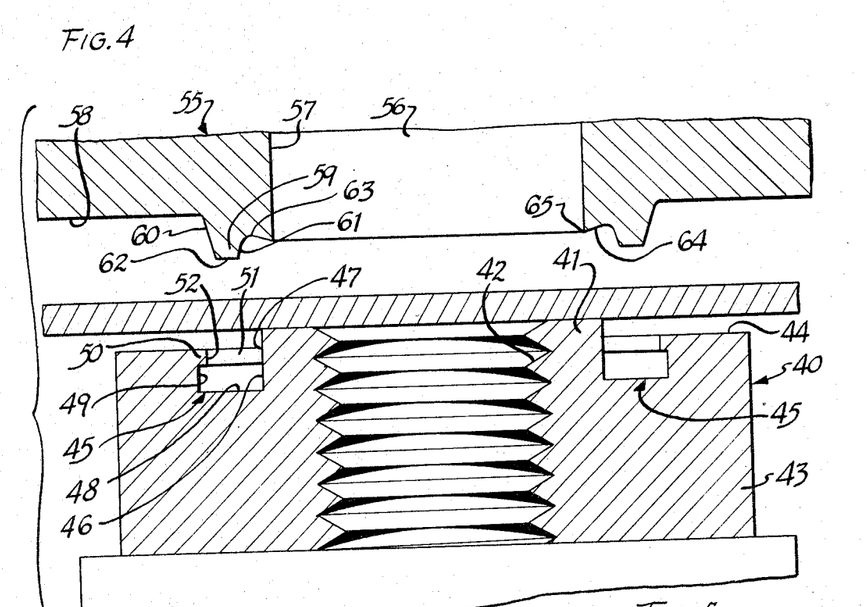
FIGURE 4 is a view similar to FIGURE 3 illustrating a modified form of nut.

In that embodiment of the invention illustrated in FIGURE 4 of the drawings, a modified form of nut, identified by reference numeral 40 is utilized. This nut 40 is substantially the same as that heretofore described, being provided with an upstanding pilot portion 41 surrounding the threaded aperture 42 and having outer flanges 43 having exposed upper flange or ledge surfaces 44.

Once again, the nut 40 is provided with a groove indicated generally at 45 between the flange portion 43 and the pilot portion 41. This groove 45 is of different configuration than the groove 28 heretofore described, the groove 45 including an inner vertical wall surface 46 formed as a continuation of the side surface 37 of the nut pilot portion 41. A groove side wall 46 merges with a planar groove bottom wall 48 extending from the inner wall 46 to an outer wall 49, this outer wall 49 terminating in spaced relation to the exposed ledge surface 44 of the flange 43, the ledge surface being provided with an inturned ear or projection 50 which restricts the mouth 51 of the groove 45. The ledge terminates in an inner vertical surface 52, this surface 52 being spaced from the inner groove wall 46 through a distance less than the space between the inner wall surface 46 and the outer wall surface 49 of the groove 45. Thus, the groove 45 may be properly defined as "re-entrant."

The nut 40 heretofore described is particularly adapted for utilization with a die button 55 illustrated in FIGURE 4 of the drawings. This die button 55 is similar to the die button 35 heretofore described inasmuch as it is provided with a central, rectangular aperture 56 having side walls 57. The die button is circumscribed by horizontal panel-contacting flange surfaces 58 and interposed between the surfaces 58 and the aperture 56 are a pair of parallel, elongated die button ridges 59 defined between downwardly convergent lateral outer surfaces 60 and inner surfaces 61 joined by a substantially planar lower surface 62. The inner ridge surface 61 merges through a radiused corner 63 with a downwardly and inwardly inclined staking surface 64 terminating at the aperture 57 in a staking corner 65.

Figure 5:
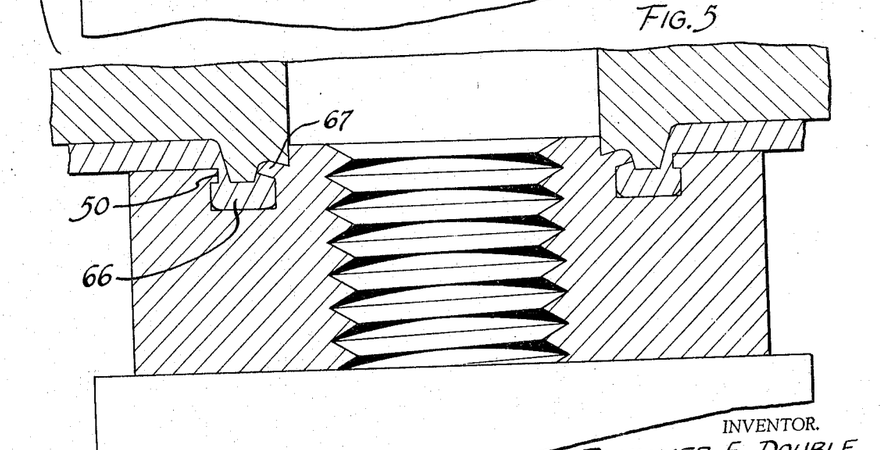
FIGURE 5 is a view similar to FIGURE 2 utilizing the nut of FIGURE 4.

The method carried out in conjunction with the nut 40 and the die button 55 of FIGURE 4 is well illustrated in FIGURE 5 of the drawings. It will be appreciated that the nut pilot portion 41 cooperates with the die button 55 to punch the pilot portion 41 through the panel 20 while the lower ledge surface 62 contacts the upper surface of the panel outwardly of the die button to displace a portion of the panel surrounding the punched aperture therein downwardly into the groove 45. This metal displaced into the groove 45 enters through the restricted opening 51 of the groove to be followed by the die button rib 59 which also enters the restricted opening 51 to effect metal flow into the groove beneath the overhanging ledge 52.

Thus, the re-entrant recess 45 is substantially filled with sheet metal by operation of the die button upon relative nut-die button displacement.

After piercing of the opening, and after initial filling of the recess 45 by operation of the die button ridge 59, the die button staking edges 65 contact the pilot portion 41 of the nut inwardly of the nut side surfaces 47 and slices from the nut pilot portion a relatively small amount of nut metal. This nut metal is cammed outwardly by the inclined surface 64 adjacent the staking edge 65 so that the nut metal is displaced to overlie the inner wall 46 of the recess 45.

From FIGURE 5 it will be seen that the panel metal 66 filling the recess 45 is, in effect, confined therein by the nut ledge 50 and the staked and outwardly displaced portion 67 of the nut pilot portion 41. It will be noted also that the arcuate joining surface 63 interposed between the inclined die button surfaces 61 and 64 serves to limit the lateral displacement of the staked portion of the nut and to direct this staked portion of the nut downwardly into fully clinched, flush engagement with the panel metal filling the recess.

The net effect of displacement of the staked portion 67 of the nut 40 and its combination with the nut ledge 50 overlying the recess 45 is to provide a final nut groove of double re-entrant shape having an entrance mouth which is substantially restricted by the nut metal displaced during the staking operation. Additionally, the staking of the nut reduces the total volume of the groove and insures complete entrapment of the displaced panel metal by contiguous portions of the nut.

Figure 6:
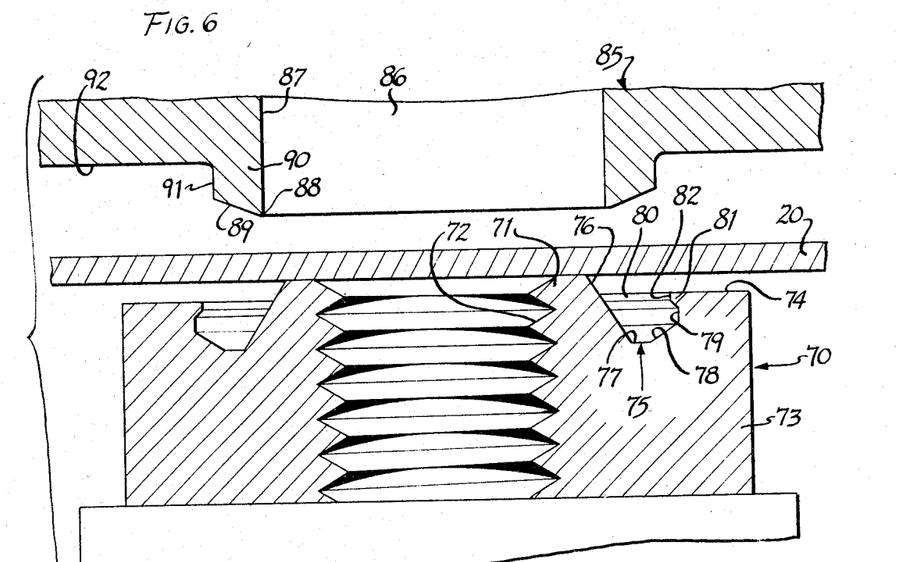
FIGURE 6 is a view similar to FIGURE 3 utilizing another modified form of nut.
Figure 7:
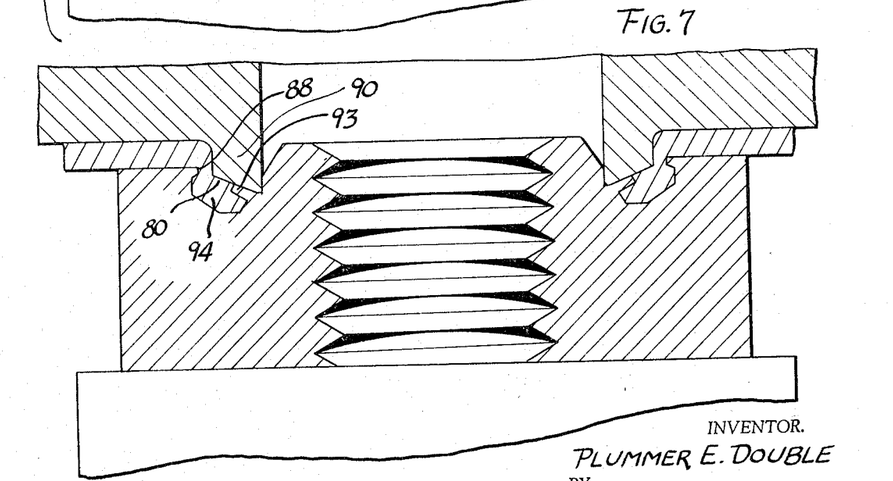
FIGURE 7 is a view similar to FIGURE 2, but utilizing the nut of FIGURE 6.

In FIGURES 6 and 7 yet another form of nut 70 is provided, the nut 70 being generally similar to those nuts 21 and 40 heretofore discussed in that the nut is provided with a central pilot portion 71 surrounding a central axially extending threaded aperture 72 and laterally directed side flanges 73 are provided to either side of the nut, the flanges having upper free ledge surfaces 74.

The portion of the nut intermediate the pilot portion 71 and the flanges 73 thereof is provided with a groove, indicated generally at 75, of different configuration than the grooves 28 and 45 heretofore described. More specifically, the groove 75 is defined by a downwardly and outwardly inclined surface 76 merging into a flat, substantially horizontal bottom 77. The bottom 77 in turn merges into an outer, upwardly and outwardly directed surface 78 terminating in a vertical surface 79. A restricted groove inlet 80 is defined by an overhanging flange ledge 81, the inner end surface 82 of which lies closer to the surface 76 than does the vertical surface 79 of the groove. Because of the restricted inlet 80 of the groove 75, the groove may again be termed "re-entrant," although the direction and slope of the inclined surface 76 opens the mouth 80 of the groove to accommodate the ready entry of metal from the panel 20 thereinto.

Once again, the nut 70 is utilized with a die button identified generally at 85 and having a central aperture 86 defined by vertical, rectilinear walls 87 terminating in lower staking surfaces 88 formed at the juncture of each of the walls 87 with an upwardly and outwardly sloping wall 89. The lower portions of the die button walls 87 and the wall 89 thus define a die button rib 90 having an outer vertical wall 91 merging into outer horizontal panel-retaining surfaces 92.

The operation of the method utilizing the nut 70 is well illustrated in FIGURE 7 of the drawings, from which it will be seen that the staking rib 90 displaces metal from the panel 20 immediately adjacent the aperture punched therein by operation of the pierce nut into the groove 75 through the relatively open, though re-entrant, mouth 80 of the groove. Subsequently, the staking edge 80 of the die button rib 90 contacts the inclined nut surface 76 to displace a portion of this nut surface outwardly, as at 93, to overlie the panel metal 94 previously displaced into the groove 75. As in conjunction with FIGURES 4 and 5, heretofore described, the staking of the nut metal, as at 93, forms the groove 75 to a "double re-entrant" configuration at which the previously open mouth 80 of the groove becomes substantially restricted intermediate the shoulder projection end surface 88 and the staked portion 93 of the nut. At the same time, the volume of the groove 75 is substantially reduced, but only after the groove has been at least partially filled by panel metal forced thereinto by the die button rib 90.

Figure 8:
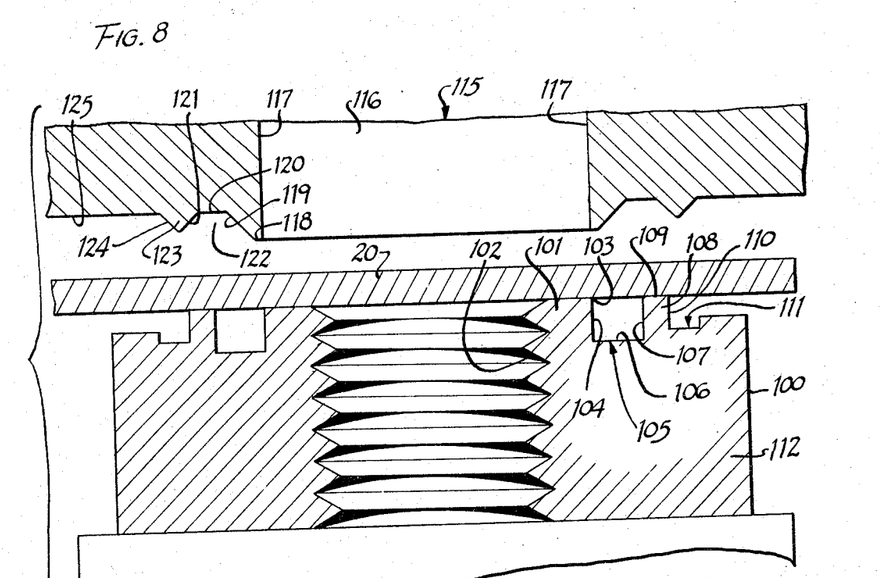
FIGURE 8 is a view similar to FIGURE 3 utilizing still another form of nut.
Figure 9:
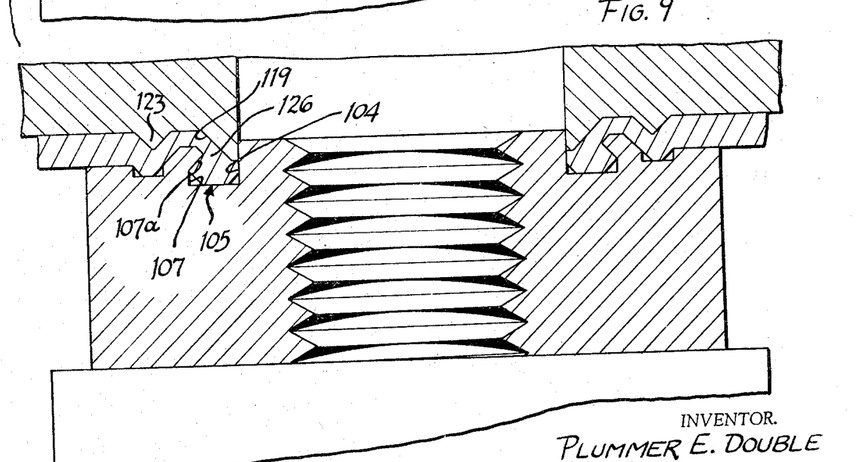
FIGURE 9 is a view similar to FIGURE 2 but utilizing the nut of FIGURE 8.
Figure 10:
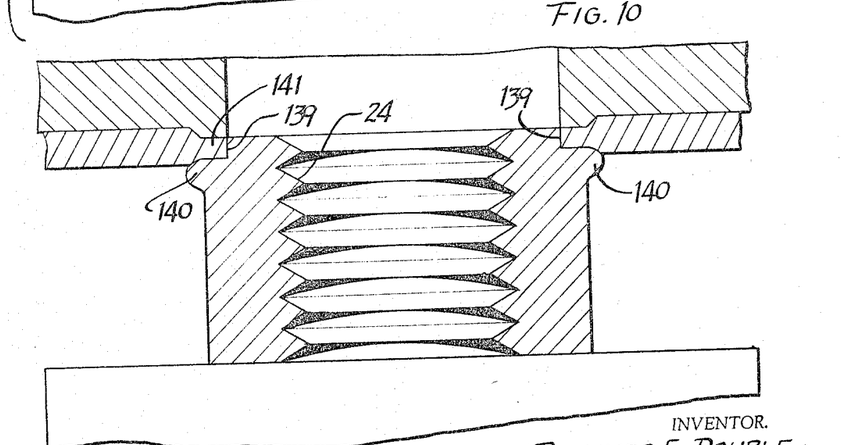
FIGURE 10 is a view taken along the plane 10—10 of FIGURE 1, again illustrating the nut-panel assembly in conjunction with the die button utilized in carrying out the method.

Turning now to the embodiment of the invention illustrated in FIGURES 8 and 9, a nut 100 is utilized, this nut having a conventional central pilot portion 101 surrounding the axially extending multiple threaded aperture 102, and the pilot portion having outer, right-angular piercing corners 103.

This outer piercing corner defines the upper limit of an inner planar wall 104 forming a part of a groove 105. A groove bottom wall 106 extends between the vertical wall 104 and a second vertical wall 107 of a nut projection 108 having an upper surface 109 flush with the exposed upper surface of the nut pilot portion 101. This nut projection 108 is relatively thin and is provided with an outer surface 110 merging into a second groove 111 of substantially less depth than the groove 105 and located intermediate the nut projection 108 and the nut shoulder 112.

The nut 100 is utilizable in connection with a die button 115 having a central aperture 116 defined by laterally spaced side walls 117 spaced apart to substantially the same distance as the spacing between the pilot side walls 104. The side wall surfaces 117 terminate at lower die button surfaces 118 merging through upwardly and outwardly inclined surfaces 119 with a horizontal die button surface 120. The sloping die button surfaces 119 and the horizontal die button surfaces 120 cooperate with an outer inclined die button surface 121 to define a die button recess 122 vertically aligned with and adapted to receive therein the nut projections 108.

An outer die button rib 123 is provided outwardly of the recess 122 by a sloping wall 124 cooperating with and converging toward the wall 121. A panel-contacting and retaining outer horizontal surface 125 is positioned alongside this rib 123.

In operation, the die button surface 118 or, more accurately the corner defined by the die button surface 118 and the die button aperture wall 117 cooperates with the piercing corners 103 of the nut pilot portion 101 to accommodate piercing of the panel 20 by the nut pilot portion 101. Following such piercing, the die button projection defined by the surfaces 117, 118 and 119 forces panel metal into the nut grooves 105.

It will be noted that the rib 123 terminates at a level substantially further from the nut than does the inner die rib surface 118. Thus, the panel 20 is deflected into the groove 105 prior to any substantial deformation of the panel by the rib 123. This panel metal 126 filling the groove 105 is deflected away from the shearing edges 103 of the pierce nut pilot portion 101 by the inclined surface 19 of the die button.

Following substantial filling of the groove 105, the panel metal displaced downwardly by the rib 123 is deflected into the outer groove 111 of the nut. Due to the confinement of the metal in the groove 105 and the tapered configuration of the inner rib wall 119, panel metal is directed by the inner face 121 of the rib 123 toward the center or pilot portion of the nut. This direction of the metal generates pressure against the outer surface 110 of the nut projection 108 to deflect the projection toward the center of the nut. As a result of this force upon the projection 108 and the reduced thickness of the projection 108, the projection is collapsed at its upper portions.

It will be noted that the projection is, in its initial undeformed state (FIGURE 8), much closer to the surface 121 of the die button 115 than it is to the surface 119. As a consequence, there is a greater distorting force upon the projection directed toward the axis of the nut than away from the axis of the nut and the projection collapses until such time as the forces thereon are equalized, i.e. until such time as the projection is surrounded by substantially a constant thickness of metal. At this time, the projection has been collapsed to such an extent that the upper portion 107a of the projection wall 107 forms, in conjunction with the adjacent pilot portion side wall 104, a re-entrant recess which is substantially filled with panel metal, this metal being trapped between the wall 104 and the deflected projection wall 107a.

Thus, by utilization of the nut 100 and the die button 115, it is possible to form the re-entrant groove within which the metal is trapped during the piercing and panel deflection operations.

In FIGURES 10 through 13, a different aspect of the invention is illustrated wherein the non-flanged sides of the nuts are deformed during the piercing and swaging operation to provide an increased nut-panel bearing area effective to materially increase the resistance of the nut to "pull-out" during retention of the threaded member.

Figure 11:
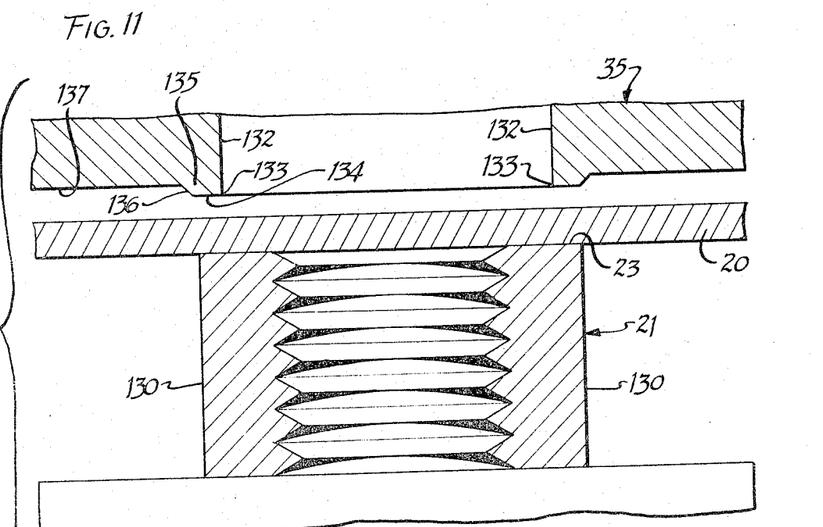
FIGURE 11 is a view similar to FIGURE 3, but utilizing the nut and die button of FIGURE 10.

For example, in that embodiment of the invention illustrated in FIGURE 11 of the drawings, the nut 21 is provided with planar side surfaces 130 which, with the nut oriented as illustrated in the drawings, extend vertically. These nut side surfaces 130 terminate in upper or end nut surfaces 23 which are coplanar with the upper flange surfaces. Superimposed upon the nut is the panel 20.

The die button utilized in conjunction with the nut 21 is as illustrated in FIGURE 2 of the drawings in which those sides 132 of the aperture 36 of the die button 35 are spaced apart a distance substantially less than the space between the nut side surfaces 130. The die button side surfaces 132 terminate in lower piercing edges 133, these edges being formed at the inner margin of a die rib 135 merging through an outwardly and upwardly inclined outer surface 136 with horizontal die marginal surfaces 137. Upon actuation of either the nut or the die button, the panel 20 is sheared by the edges 133 of the die button to pierce the nut through the panel. At the same time, the die button ridge 135 contacts the upper surface of the panel and reduces the panel thickness by squeezing the panel between the die button surface 134 and the nut surface 23.

It will be noted that the edges 133 are located substantially closer together than the side surfaces 130 of the nut, and continued movement of the nut relative to the die button forces the panel portion 141 contacted by the die button rib surface 134 into the nut. The nut metal thus displaced appears as lateral bulges or projections 140 contacting the undersurface of the panel in proximity to the sheared panel edges 139.

The forcing of the panel into the nut causes the protuberance 140 to be formed completely along the complete length of the nut side surfaces 130. It is believed that a portion of this nut metal is forced to flow between the remainder of the nut and the sheared panel edge 139, although most of the nut metal is probably merely displaced downwardly to appear as the protuberance 140.

Figure 12:
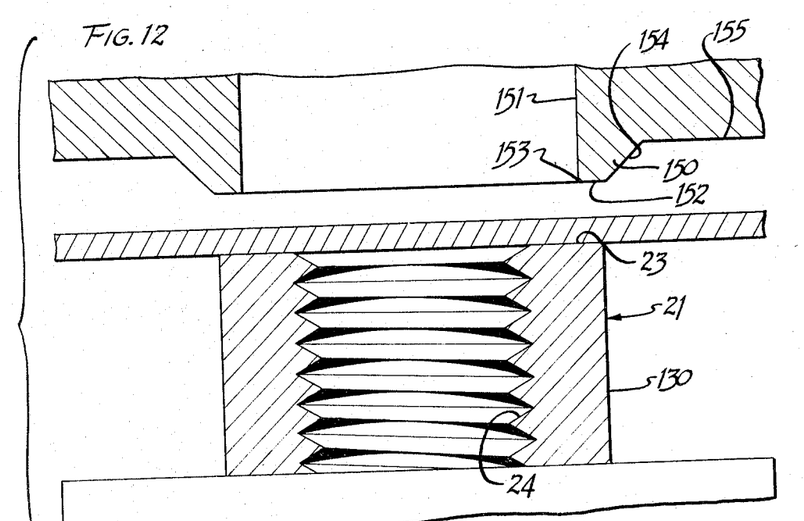
FIGURE 12 is a view similar to FIGURE 11, but utilizing a different form of die button.
Figure 13:
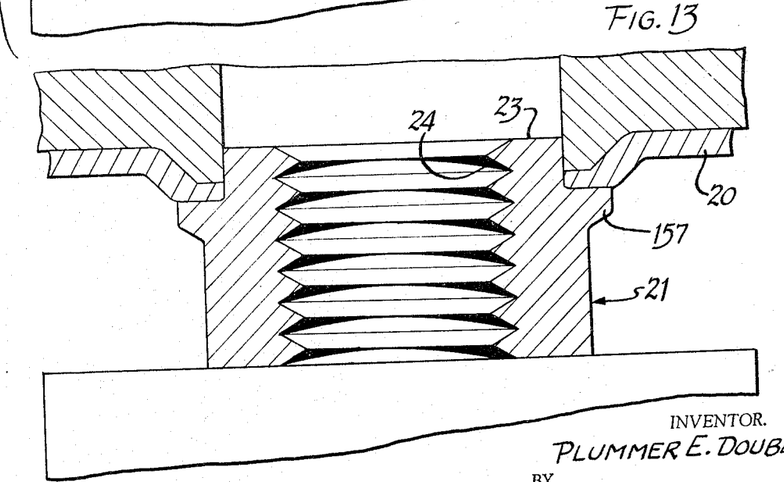
FIGURE 13 is a view similar to FIGURE 10, but utilizing the die button of FIGURE 12.

In that embodiment of the invention illustrated in FIGURES 12 and 13, a nut such as the nut 21 of FIGURE 11 is utilized in conjunction with a different form of die button in which the die button rib 150 is of greater vertical dimension, this rib 150 being defined by planar interior aperture-defining surfaces 151 forming with lower rib surfaces 152 a panel-piercing edge 153. The surface 152 merges through an outwardly and upwardly inclined surface 154 with the outer die button surfaces 155.

In use, the nut and die button are relatively displaced to pierce the nut pilot portion through the panel 20, such relative movement being continued until such time as the undersurface 155 of the die button becomes flush with the free upper surface 23 of the pilot portion of the nut 21. Such movement forces the die button rib surface 152 and the piercing corner 153 of the die button into the outer portions of the nut pilot 23 to displace a portion of the nut metal into a longitudinally extending protuberance 157 identical to, but larger than the protuberance 140 of FIGURE 10.

In each of the FIGURES 10-13, the protuberances 140 and 157 reinforce the nut-panel assembly against relative separation of the panel and the plate because of forces exerted on the nut by a screw threaded into the nut aperture 24.

Figure 14:
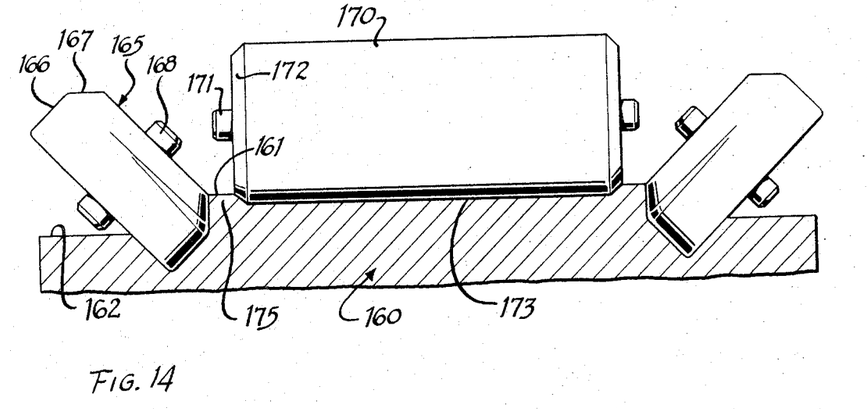
FIGURES 14 through 16 illustrate successive rolling steps sequentially carried out to attain a nut blank having the cross-sectional contour of the nut of FIGURES 1–3.
Figure 15:
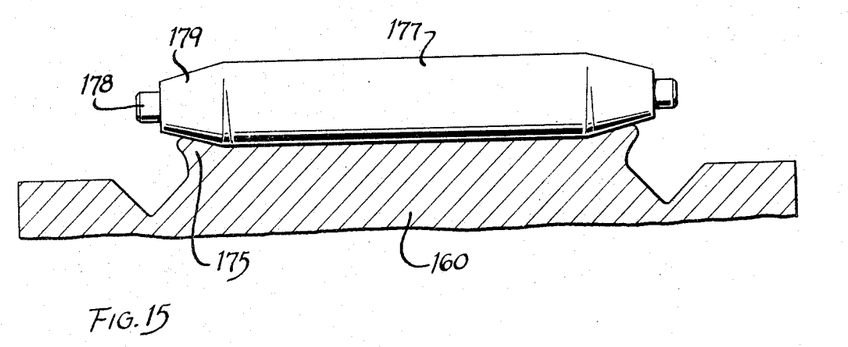
Figure 16:
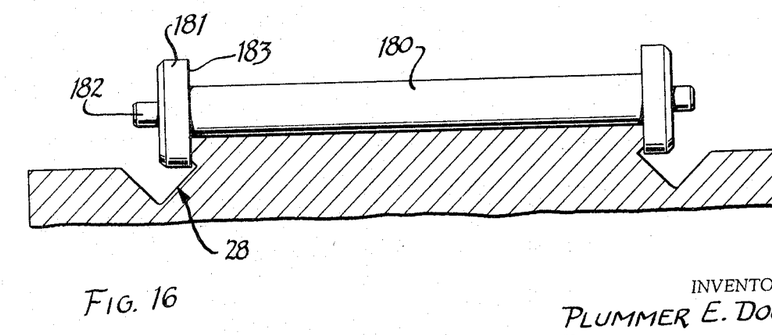

In FIGURES 14 through 16, the method of forming a nut by rolling is illustrated, the particular illustrated nut configuration being that of FIGURES 1 through 3, inclusive.

As shown in FIGURE 14, a strip of steel 160 is initially contacted by a set of forming rolls or the like to define a cross-sectional configuration including an upper planar central portion 161 and side flanges 162 of less thickness projecting laterally to either side of the central portion 161. Next, the area of juncture between the thickened central portion 161 and the lateral flange portions 162 is initially grooved by individual rollers 165 having a main cylindrical portion 166 and frusto-conical secondary portions 167 convergent toward the thickened center portion 161 of the strip 160. These rollers 165 are supported on power rotatable drive shafts 168 angularly disposed relative to the axis of the strip 160.

Concurrently, the upper surface 161 of the thickened central portion of the strip 160 is contacted by a generally cylindrical roller 170 rotatable about a transverse or horizontal shaft 171, this roller being provided with frusto-conically chamfered end surfaces 172. By operation of this roller, the central thickened surface 161 of the strip 160 is medially depressed as at 173 to define raised marginal projections 175 extending longitudinally of the strip.

Next, following the operation illustrated in FIGURE 14 of the drawings, the strip 160 is contacted with a cylindrical roller 177 rotatable about a horizontal shaft 178, this roller being provided again with frusto-conical ends 179 convergent laterally outwardly of the roller to partially laterally deform the ridges 175 formed by the co-operation of the rollers 165 and 170 in FIGURE 14. Finally, the partially deflected projections 175 are rolled to their final shape to define the re-entrant grooves 28 by means of a cylindrical roll 180 of relatively small diameter and provided with radially enlarged cylindrical sections 181 adjacent the extremities thereof and coaxial with the roller 180 for rotation about a shaft 182. The projection 175 is contacted by the inner radial face 183 of each of the end rolls 181 so as to form the projection 175 into a true right angular corner ledge overlying the groove 28 and defining the re-entrant groove mouth.

*Summary*

To summarize the several embodiments of the invention:

(1) The pierce nuts are each secured to the panel by the entrapment of a portion of the panel in a re-entrant groove in the nut, the re-entrant groove being at least partially defined by deformation of the nut after piercing.

(2) Deformation of the nut increases nut-panel retention by decreasing the nut groove volume after filling of the groove with panel metal and by substantially increasing the re-entrant character of the groove, e.g. by lengthening a re-entrant nut ledge (FIGURES 1–3), by rendering the groove "doubly-re-entrant" (FIGURES 4–7), or by deformation of a nut projection (FIGURES 8 and 9).

(3) Additionally, the nut-to-panel bearing area is substantially increased by forcing panel metal into the non-grooved and non-flanged sides of the nut. This operation is carried out by the same die button and contemporaneously with the performance of the operation of displacing and entrapping panel metal in the nut grooves, if desired or necessary.

(4) The nut is preferably made by a progressive rolling operation to form a strip having the cross-sectional configuration of the flanged portion of the nut. The strip is then cut to length to form individual nuts.

Having thus described my invention, I claim:

1. In a method of assembling a rectangular nut to a panel, the nut having a pilot portion and a pair of oppositely laterally extending flanges along opposite sides of the nut, said flanges each having a groove opening toward the pilot portion, by interposing the panel between a die button and the nut, the panel contacting the pilot portion only of the nut, the steps of relatively displacing the nut, panel and die button in a single, uninterrupted motion sequentially (1) piercing the nut pilot portion through the panel, (2) displacing a portion of the panel adjacent the nut pilot portion into the nut groove, (3) deforming the nut immediately adjacent the groove in a direction to overlie the groove and the metal displaced thereinto, and (4) displacing the non-flanged sides of the nut at the pilot portion thereof in contact with the panel to provide an enlarged nut-panel contact area.

2. In a method of assembling a nut to a panel, the nut having a pilot portion, an adjacent flange portion and a recess in the flange portion having an overhanging flange portion defining a re-entrant groove with a restricted entry throat, by interposing the panel between a die button and the nut, the panel contacting the pilot portion of the nut, the steps of relatively displacing the nut, panel and die button in a single, uninterrupted motion sequentially (1) piercing the nut pilot portion through the panel, (2) displacing a portion of the panel adjacent the nut pilot portion beyond the flange portion and into the re-entrant nut groove, and (3) staking the nut pilot portion immediately adjacent the groove in a direction toward the overhanging flange portion to further restrict the groove throat, thus trapping in the groove the displaced panel metal.

References Cited by the Examiner

UNITED STATES PATENTS

| | | | |
|---|---|---|---|
| 521,825 | 6/1894 | Shipe | 29—432 |
| 2,183,641 | 12/1939 | Double | 29—509 |
| 2,236,180 | 3/1941 | Kost | 29—509 |
| 2,281,699 | 5/1942 | Langmaid et al. | 151—41.72 |
| 2,415,695 | 2/1947 | Kann | 151—41.72 |
| 2,749,606 | 6/1956 | Donahue | 29—432 |
| 3,229,363 | 1/1966 | Bien | 29—432 |

CHARLIE T. MOON, *Primary Examiner.*

CARL W. TOMLIN, D. R. BIRCHALL,
*Assistant Examiners.*